INVENTORS
RICHARD C. HANSEN &
BY MARTIN L. LEVENE
Morris R. Rabkin
ATTORNEY

INVENTORS
RICHARD C. HANSEN &
MARTIN L. LEVENE

ELECTROSTATIC WEB FEEDING APPARATUS

Filed Sept. 27, 1962 4 Sheets-Sheet 3

INVENTORS
RICHARD C. HANSEN &
BY MARTIN L. LEVENE
Morris L. Rabkin
ATTORNEY

ELECTROSTATIC WEB FEEDING APPARATUS

Filed Sept. 27, 1962 4 Sheets-Sheet 4

INVENTORS
RICHARD C. HANSEN &
MARTIN L. LEVENE
BY Morris A. Rabkin
ATTORNEY

3,273,774
ELECTROSTATIC WEB FEEDING APPARATUS

Richard C. Hansen, Collingswood, N.J., and Martin L. Levene, Elkins Park, Pa., assignors to Radio Corporation of America, a corporation of Delaware Filed Sept. 27, 1962, Ser. No. 226,554
16 Claims. (Cl. 226—50)

This invention relates to apparatus for feeding a flexible medium, and particularly to improved drive apparatus for incrementally moving a flexible medium.

The invention is especially suitable for use in recording and reproducing apparatus for transporting a record medium, such as a magnetic tape record, along a path past a transducing device which may record information on or reproduce information from the medium. The invention is, however, generally useful for feeding flexible media. Accordingly, it is to be understood that the term "tape," as used herein, encompasses other films, wire and web media.

It is often desirable to asynchronously index successive increments of a record, such as a paper or magnetic tape, at a transducing device, such as a punch or magnetic head so that characters may be recorded on the tape for example, in digital form. Unless the record is accurately metered, the timing of the characters read from the tape is irregular. Sprocket holes may be used to control tape feed and thereby obtain some degree of accuracy. However, some records, particularly magnetic tapes, do not generally have sprocket holes. Mechanisms have heretofore been suggested to provide incremental drives. However, these mechanisms are usually complex and expensive when accurate metering of the tape is required. No lubricated bearings need be used, if desired, in mechanism embodying this invention.

Accordingly, it is an object of the present invention to provide an improved tape feeding apparatus which can accurately and incrementally feed a tape along a path.

It is a still further object of the present invention to provide improved apparatus for incrementally feeding a tape which requires relatively few moving parts and which is relatively easily constructed at lower cost than known incremental drive mechanisms.

It is a still further object of the present invention provide improved magnetic recording apparatus especially suitable for asynchronous recording of digital data, as may be supplied by a keyboard device.

It is a still further object of the invention provide a tape feeding apparatus which does not require moving drive parts.

Briefly described, the invention may be embodied in tape feeding apparatus having a plurality of tape drive units spaced along a desired path of tape travel. These drive units may be energized for attracting the tape thereto, as, for example by establishing electric or magnetic attractive forces between the tape and the drive units. Energizing means are provided for alternately energizing the drive units. When the tape is attracted to one of the drive units, an increment of tape is advanced along the path. The other unit is then energized and takes up the previously advanced tape increment, while the one unit is deenergized. The tape is again moved incrementally when the first unit is energized on the succeeding cycle of alternate energization of the units. The drive units may be stationary. Thus, the apparatus does not require lubricated bearings. The distance the tape is advanced upon each cycle of energization of the drive units depends upon the length of the drive units. Accordingly, the tape may be metered accurately and indexed precisely at a reference point along its path of travel.

The invention itself, both as to its organization and method of operation, as well as additional objects and advantages thereof, will become more readily apparent from a reading of the following description in connection with the accompanying drawings, in which.

Figures 5, 6:
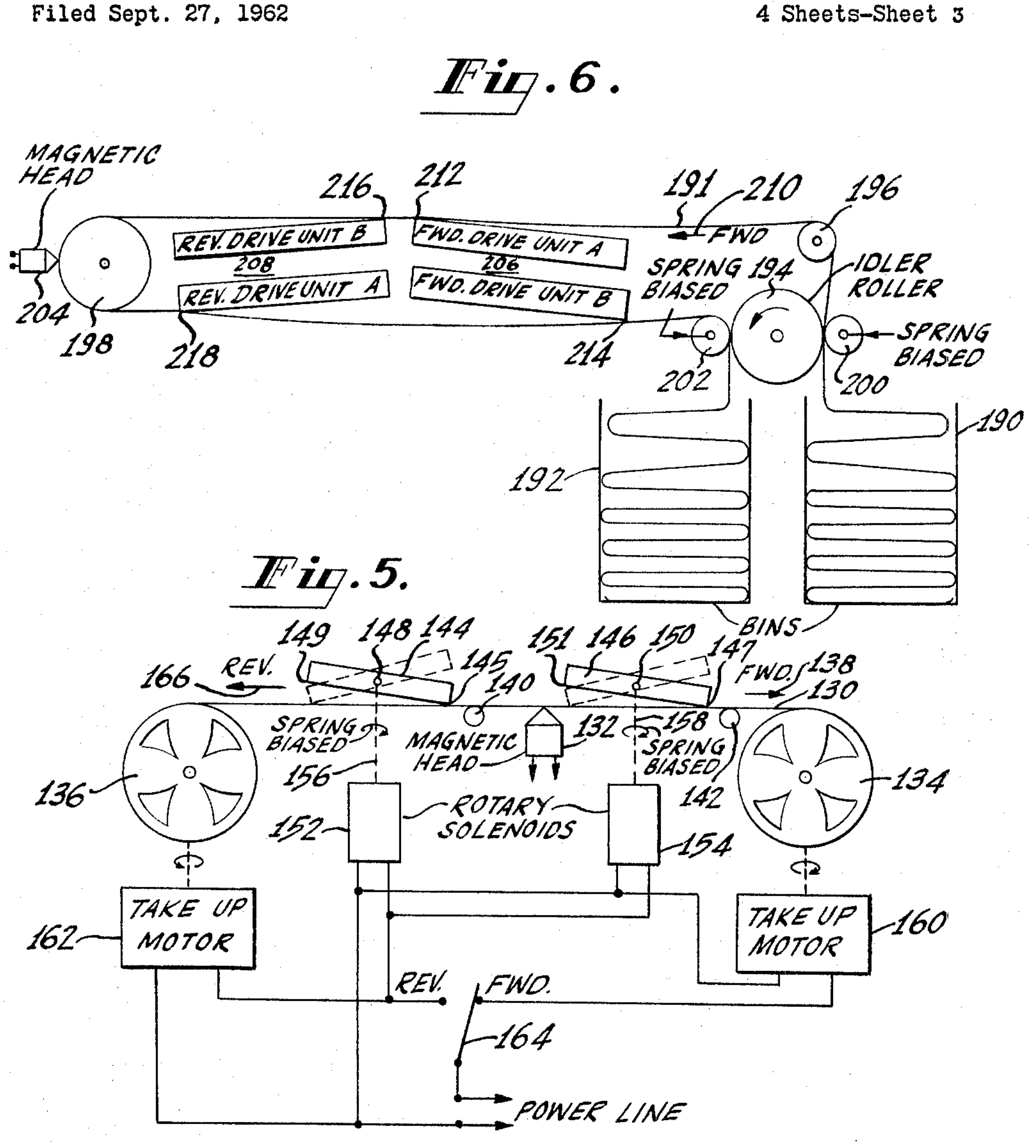
FIG. 5 is a diagrammatic view of another tape transport apparatus embodying the invention.
Figure 5A:
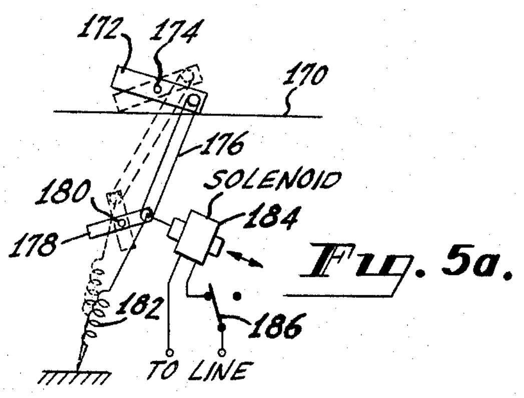
Figure 7:
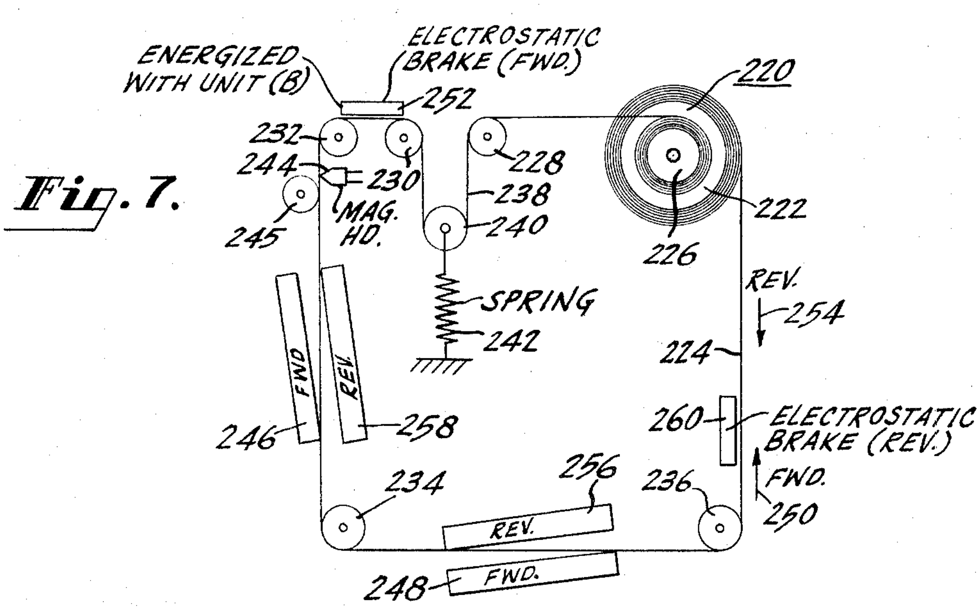
Figure 8:
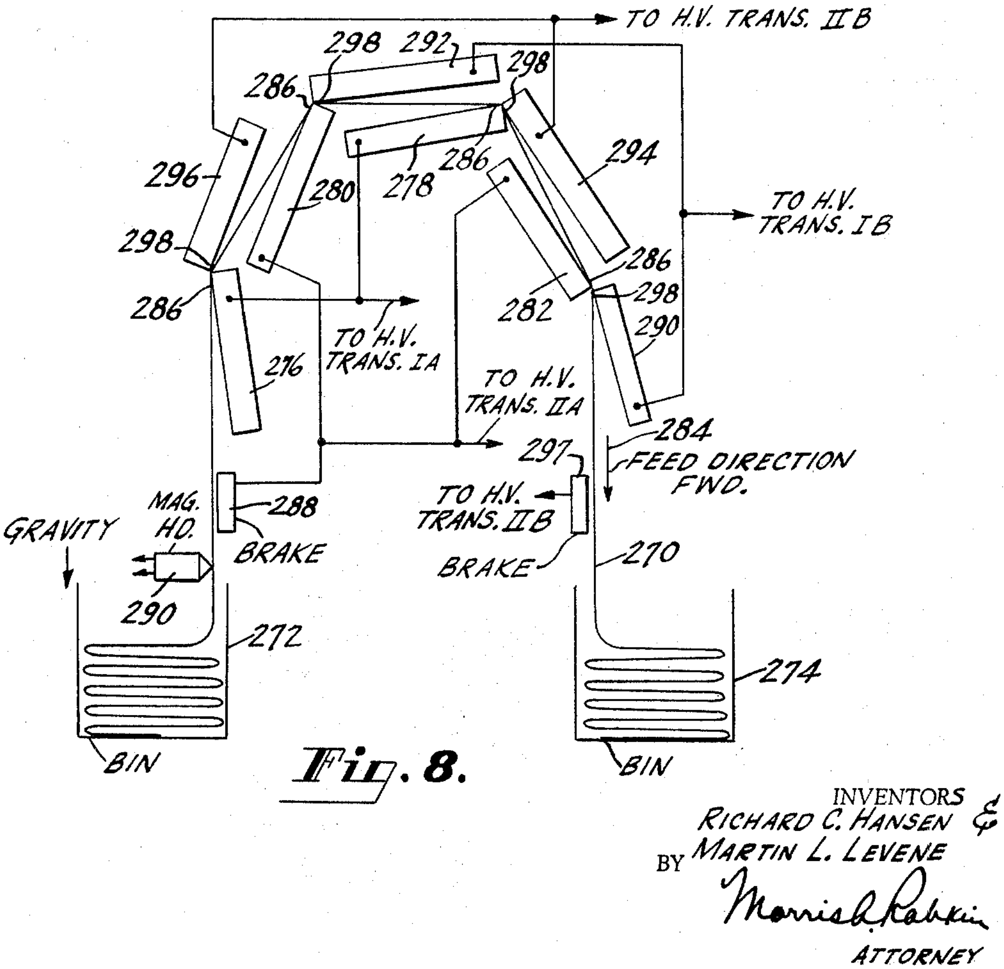

FIG. 5*a* is a diagrammatic view of a mechanism for reversing the direction of tape drive in the apparatus of FIG. 7;

FIG. 6 is a diagrammatic view of still another tape transport apparatus embodying the invention;

FIG. 7 is a diagrammatic view of yet another tape transport mechanism embodying the invention; and FIG. 8 is a diagrammatic view of a still further tape transport apparatus embodying the invention.

Figure 1:
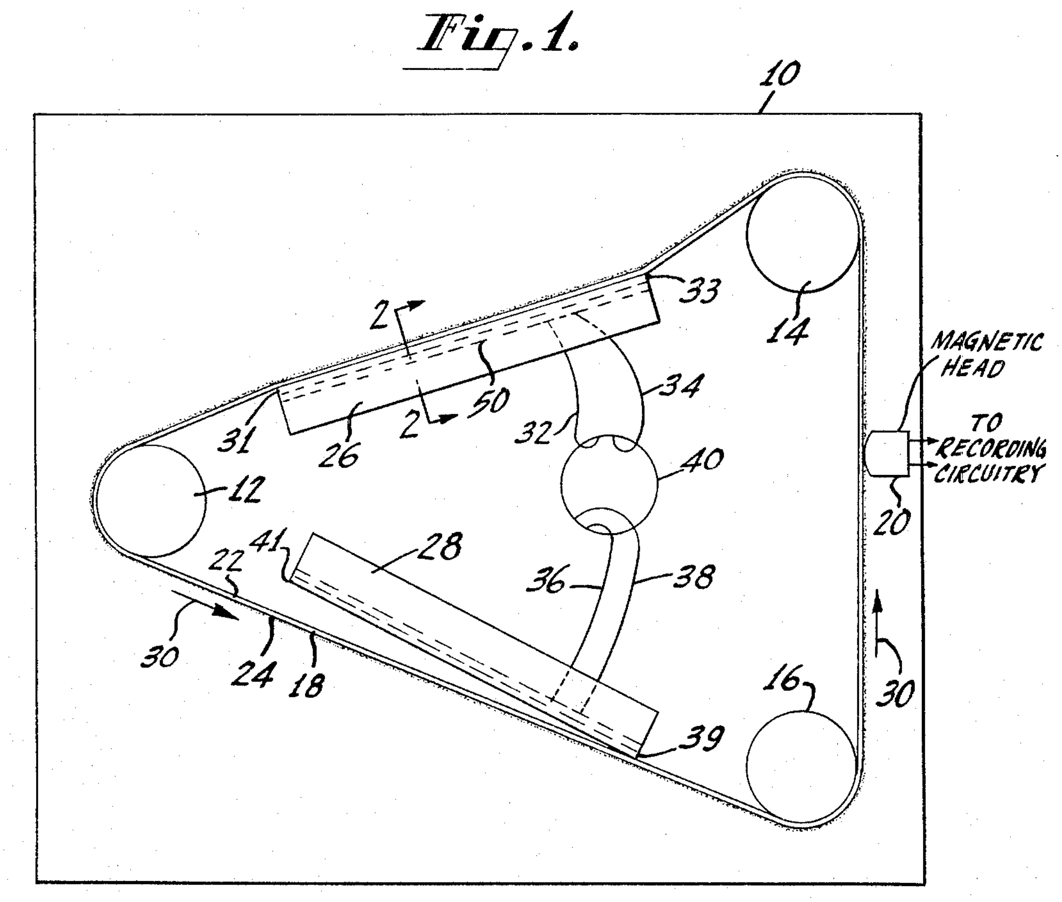
FIG. 1 is a plan view of a tape transport apparatus embodying the invention including a pair of tape drive units.

Referring more particularly to FIG. 1, there is shown a tape deck 10 on which three cylindrical tape guides 12, 14 and 16 are mounted. An endless magnetic tape 18 is disposed along a triangular loop path around these guides 12, 14 and 16. The sides of this path are along lines tangent to the guides. The guides may be flanged so as to provide edge guidance for the tape 18. If desired, the guides may be journaled for rotation on shafts which extend outwardly from the deck 10.

A magnetic head 20 is disposed at a fixed position along the tape path. This magnetic head may have one or more core units for recording one or more tracks spaced from each other transversely of the tape. The magnetic head may be connected to recording circuitry which energizes the head for recording or writing information on the tape 18. This record circuitry may be of the type to be described hereinafter in connection with FIGS. 5 and 6 of the drawings. The magnetic tape 18 may be of the type known in the art having a base film 22 of flexible plastic material, such as a polyester plastic of the tape sold under the trade name "Mylar" by E. I. du Pont de Nemours, Inc., of Wilmington, Delaware. The base film 22 has a coating 24 of magnetizable magnetic material such as a magnetic oxide of the type known in the art. This coating 24 is conductive, but has a high electrical resistivity, and faces outwardly from the loop. The magnetic head on the loop is desirably in contact with the coating 24.

A pair of electrostatic tape drive units 26 and 28 are provided for incrementally driving the tape loop in the counter clockwise direction as indicated by the arrow 30. The tape drive units are elongated and mounted on the deck 10 inside the loop of the tape 18 and are inclined toward the path of the tape in the direction of tape motion. An acute angle of inclination of from 3 to 6 degrees may be suitable. The leading ends of the units 26 and 28 are in contact with the base 22 side of the tape. These contacting ends of the units 26 and 28 are called their "heels" 31 and 39, respectively. The lagging ends of the units 26 and 29 are called their "toes" 33 and 41, respectively. The units 26 and 28 are energized by voltages applied by wires 32, 34, 36 and 38 which are connected thereto and which extend through a hole 40 in the deck 10. Suitable circuitry is connected to these wires 32, 34, 36 and 38 for energizing the units 26 and 28 and is described hereinafter in connection with FIG. 4 of the drawings.

Figures 2, 3:
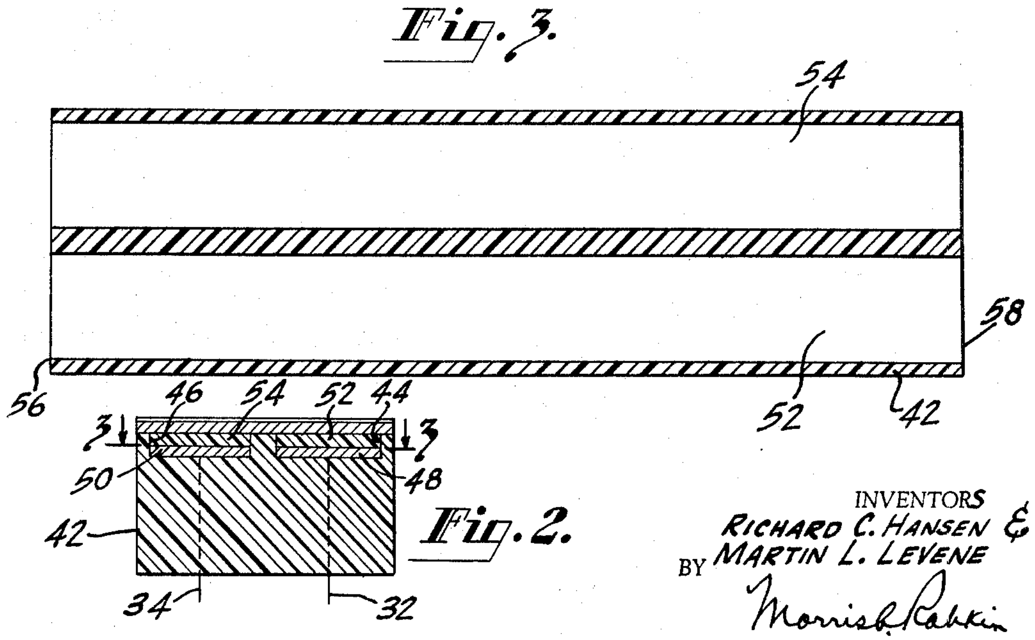
FIG. 2 is a transverse sectional view showing one of the tape drive units in FIG. 1 in cooperation with a magnetic tape record, the view being taken along the line 2—2 in FIG. 1.
FIG. 3 is a longitudinal sectional view of the tape drive unit shown in FIG. 2 taken along the line 3—3 in FIG. 2.

The units 26 and 28 are similar. The unit 26 is shown in detail in FIGS. 2 and 3 and includes a rectangular block 42 of insulating material, such as a plastic. A polystyrene plastic may be suitable. A pair of spaced longitudinal grooves 44 and 46 are cut in the top surface of the block 42. Plates 48 and 50 of conductive material, such as copper or aluminum are disposed in these grooves 44 and 46, respectively. The grooves 44 and 46 are deeper than the thickness of these plates. The grooves are filled with layers 52 and 54 of insulating material, such as a plastic potting compound of the type that sets in place. An epoxy potting resin may suitably be used. The plates 48 and 50 are then insulated from the surface of the block 42. The plates may extend to the ends 56 and 58 of the block 42, as shown in FIG. 3, or may be spaced slightly from the ends of the block and insulated at their ends by overlapping the epoxy layer. The wires 32 and 34 may be brought through openings extending from the bottom of the block to the grooves 46 and electrically connected to the plates 48 and 50. Insulating material, such as the potting resin referred to above, may be introduced around the wires 32 and 34 to set them permanently in place in the block 42.

Figure 4:
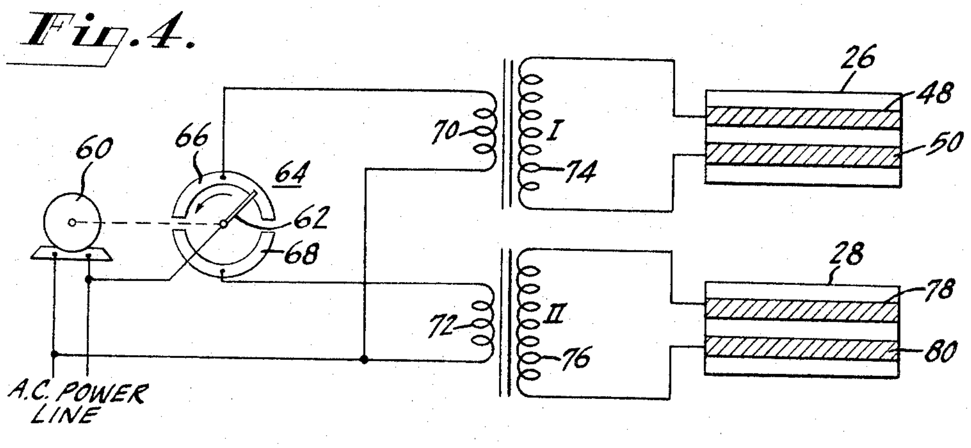
FIG. 4 is a view, partially scematic and partially diagrammatic, showing an electrical system for operating the tape drive units shown in FIG. 1.

The electrostatic drive units 26 and 28 may be energized by the circuitry shown in FIG. 4. Operating voltage from a source of alternating current, such as the A.C. power line, is connected to operate a motor 60 which rotates a contactor arm 62 of a rotary switch 64. The rotary switch has two semicircular contacts 66 and 68 which are alternately contacted by the arm 62. One side of an A.C. power line is connected to primary windings 70 and 72 of two different transformers I and II. The secondary winding 74 of a first of these transformers I is connected to the plates 48 and 50 of the electrostatic drive unit 26. The secondary winding 76 of the second transformer II is connected to the plates 78 and 80 of the other electrostatic drive unit 28. The transformers I and II may be high voltage step-up transformers which provide output voltages, for example of 15,000 volts, across their secondaries. Accordingly, high voltages are applied alternately to the drive units 26 and 28 so as to alternately energize these units. An A.C. power line frequency of 400 cycles per second has been found suitable.

When the first drive unit 26 is energized, it establishes electrostatic forces which are normal to the conductive coating 24 on the tape and the plates 48 and 50 of the drive unit 26. These forces attract the tape 18 toward the surface of the unit 26. The unit 26 is inclined to the tape path and in contact with the tape at its heel 31. The tape 18 is held at the heel 31 and then progressively attracted toward the top surface of the unit 26 starting at the heel 31 of the unit and progressing towards the toe 33 thereof. The portion of the tape loop between the guides 12 and 14 is effectively lengthened, when the tape is attracted to the unit 26, by a length depending on the length of the unit 26 and its angle of inclination to the tape path. Since the tape is clamped at the heel 33 of the unit 26, additional tape is drawn up from the side of the loop nearest the toe 33 of the unit 26. An increment of tape therefore moves past a reference point, such as the position of the magnetic head 20, in the direction shown by the arrow 30 from the toe 33 to the heel 31 of the unit.

When the contactor 62 moves from the contact 66 to the contact 68 of the switch 64, the unit 26 is deenergized and the unit 28 is energized. Some residual attraction between the unit 26 and the tape 18 remains for a short period because of charged storage effects. The use of alternating current energization of relatively high frequency and a pair of oppositely charged conductive plates 48 and 50 makes the period of residual attraction short. The period of residual attraction also accommodates for the time required to switch between the contacts 66 and 68. Since the heel 39 of the unit 28 is in contact with the tape 18, clamping forces are immediately developed between the unit 28 and the tape which prevent the tape from being drawn in a reverse direction past the magnetic head. The unit 28 then progressively attracts the tape towards its top surface from its heel 39 to its toe 41. A tape increment corresponding to the increment advanced by the unit 28 is then transferred from the unit 26 to the unit 28, and is taken up by the unit 28. When the unit 26 is again energized and the unit 28 is deenergized, another successive tape increment is again moved an incremental step past the magnetic head. It will be observed that the tape moves one step for each cycle of alternate energization of the units 26 and 28. Since the amount of tape moved by the units 26 and 28 depends upon their length and angular inclination from the path of the tape, a fixed discrete length of tape always is moved. Accordingly, the tape may be accurately metered and successive increments thereof may be indexed precisely at the magnetic head. This facilitates accurate registration of the head with the tape.

Electromagnetic attraction may be used to move the tape by increments. In the case of electromagnetic attraction the surface of a magnetic body may be magnetized to form a magnetic pole and attract a tape of magnetic material or having at least a length or layer of magnetic material normally to the surface of the body. Pneumatic or vacuum attraction may also be used. For example by means of vacuum chambers having perforated surfaces inclined to the tape path. The chambers may be evacuated or vented to the atmosphere alternately by means of electromagnetically operated vacuum valves which connect to a vacuum pump. As in common parlance, such vacuum means are deemed to "attract" the tape, even though the pressure forces the tape to it.

A reel-to-reel tape transport wherein a magnetic tape 130 may be fed incrementally across a magnetic head 132 is shown in FIG. 5. The tape is wound on a take-up reel 134 and a supply reel 136 and is fed in a forward direction as indicated by the arrow 138 from the supply reel 136 to the take-up reel 134 along a path defined by tape guides 140 and 142 and the mangetic head 132. Pressure pads may be used opposite the magnetic head 132 to bring the tape into contact therewith.

The tape is driven by a pair of electrostatic tape drive units 144 and 146 similar to the units 26 and 28 shown in FIG. 1. The units 144 and 146 are, however, mounted on shafts 148 and 150 which are centrally located between the ends of their respective units. The shafts are rotatable by means of rotary solenoids 152 and 154 of the type known in the art. These solenoids are desirably internally spring-biased in the direction indicated by the arrows 156 and 158. A suitable spring-biased rotary solenoid is available from Ledex, Inc., 123 Webster Street, Dayton 2, Ohio. The electrostatic units are spring-biased to the position shown in full in FIG. 5, and inclined toward the tape in the direction of forward tape feed. The heels 145, 147 of the units 144, 146 contact the base or uncoated side of the tape 130 so as not to mar or wear the magnetic coating.

The reels 134 and 136 are coupled to the shafts of motors 160 and 162, respectively. It may be desirable to couple the reels to the motor shafts by way of slip clutches so as to limit the torque applied to the reels when they are driven to take up the tape and to provide back tension on the tape when the reels operate to supply the tape. The motors and the solenoids may be energized from the alternating current power line through a S.P.D.T. switch 164 which conditions the tape transport for operation in the forward and reverse direction.

With the switch 164 disposed as shown, the transport is operative to drive the tape 130 in the forward direction. The take-up motor 160 for the take-up reel 134 is energized and the supply reel take-up motor 162 is not energized. The rotary solenoids 152 and 154 are also not energized. The drive units 144 and 146 are therefore in the position shown in full in the drawing. Power may be applied to the units 144 and 150 by a circuit such as shown in FIG. 4.

When the unit 144 is energized, an increment of tape is pulled from the supply reel 136. The tape is clamped against the heel 145 of the unit 144 so that the tape is tightly held under tension between the heel 145 and the take-up reel 134. When the unit 144 is deenergized and the unit 146 is energized, slack in the tape is taken up by the unit 146 so that an increment of tape is advanced across the magnetic head 132. At the beginning of the next cycle of alternate energization of the units 144 and 146, the unit 146 is deenergized and the slack is taken up by the take-up reel 134 as it is driven by the take-up motor 160.

When the switch 164 is thrown to condition the transport for tape feeding in the reverse direction shown by the arrow 166, the take-up motor 160 for the take-up reel 134 is deenergized and the take-up motor 162 is energized and tends to turn the reel 136 to wind tape thereon. The rotary solenoids 152 and 154 are also energized and turn the shafts 156 and 158 in a counter clockwise direction to bring the units 144 and 146 to the positions shown by dash lines in FIG. 5 with their toes 149 and 151 in contact with the base film side of the tape 130.

The unit 146, when energized, pulls an increment of tape from the reel 134. The tape increment is transferred to the unit 144 when the latter is energized and the former unit 146 is deenergized. The driven reel 146 takes up the increment of tape advanced by the unit 144, upon subsequent deenergization. Thus, successive increments of tape are advanced in the reverse direction, that is, from the reel 134 to the reel 136.

Another mechanism shown in FIG. 5*a* may be used to pivot a drive unit to selectively provide either forward or reverse drive of the tape 130. A drive unit 172 is mounted on a pivot 174 located centrally between its ends. One end of the unit 172 is pivotally connected to a link 176. This link 176 is in turn pivotally connected to another link 178 which is mounted for rotation on a pivot 180. A spring 182 is connected to the link 178 on the same side of the pivot 180 as the link 176 and tends to bias the link 178 for rotation in a clockwise direction. A double acting solenoid 184 having two windings has its armature connected to the same end of the link 178 as the link 176. A switch 186 connects the solenoid to a source of operating current. When the switch is disposed in one position, current is applied through one winding of the solenoid and causes the armature thereof to move towards the right, as viewed in the drawing. When the switch is connected to another winding of the solenoid 184, the armature moves in the opposite direction.

The links 176 and 178 and the spring 182 constitute a toggle mechanism which defines a toggle joint at the interconnection of the links 176 and 178. The solenoid moves the joint from one side of dead center to the other side of dead center so that the drive unit 174 may be disposed either in the position shown in full or the position shown by dash lines in FIG. 5*a*. Stops may be provided for engagement with either the link 176 or the link 178 for limiting the travel of the toggle joint so that the heel and toe of the unit 174 may be alternatively disposed in contact with the tape 170.

Another tape transport mechanism for feeding a tape stored in a pair of bins 190 and 192 is illustrated in FIG. 6. The tape is fed from the bin 190, past an idler roller 194, around a guide 196, around another idler roller 198, and back past the idler roller 194 into the bin 192. A pair of spring-biased pressure rollers 200 and 202 pinch the tape against diametrically opposite parts of the idler roller 194. A magnetic head 204 is disposed adjacent the coated side of the tape 191 as the tape passes around the idler roller 198.

Two pairs of tape drive units 206 and 208 are provided for driving the tape respectively in a forward direction from the bin 190 to the bin 192 in the forward direction, as indicated by the arrow 210, and from the bin 192 into the bin 190 in the reverse direction. The pair of forward drive units 206 include two units A and B each inclined toward the tape in the direction of forward tape travel. The heels 212 and 214 of the forward drive units A and B contact the tape on the base film side thereof. Similarly, the pair of reverse drive units 208 include two units A and B which are inclined towards the tape in the direction of reverse movement of the tape with their heels 216 and 218 in contact with the base film side of the tape.

The electrical circuit for operating the pair of forward drive units 206 may be similar to the circuit shown in FIG. 4. In order to energize the reverse drive units 208 of FIG. 8, switches may be provided as in FIG. 4 in the secondary windings 74 and 76 of the transformers I and II for switching the connections of these secondary windings from the forward drive units 206 of FIG. 6 to the reverse drive units 208 of FIG. 6. It may be preferable, however, to provide an additional pair of high voltage step-up transformers similar to transformers I and II and to provide single-pole double throw switches in the connections from the contacts 66 and 68 of the switch 64, either to the primaries 70 and 72 of the transformers I and II which energize the forward drive units or to the primaries of the additional transformers to energize the reverse drive units.

When the pair of forward drive units 206 are energized alternately by the energizing circuit, the unit A first pulls the tape from the bin 190. Since the tape is pinched between the idler roller 194 and the pressure roller 200, the movement of the tape towards the forward drive unit A causes the idler roller 194 to rotate in counter clockwise and, in turn, drive an increment of tape (e.g. an increment previously attracted to the other forward drive unit B) into the other bin 192. When the forward drive unit B is energized and the first forward drive unit A is deenergized, the increment of tape pulled by the forward drive unit from the bin 190 is taken up and transferred to the second forward drive unit B. A new successive increment of tape is therefore positioned at the magnetic head and is available for receiving a character or other unit of information. When the first forward drive unit A is again energized and the forward drive unit B is deenergized, a new increment of tape is withdrawn from the bin 190. The idler roller 194 is caused to rotate so as to take up and advance the slack increment of tape released by the second drive unit B upon deenergization thereof. The idler roller in cooperation with the spring-biased presure rollers eliminates the need for a motor driven take-up drive for the tape transport mechanism. The system operates similarly when the pair of reverse drive units 208 are alternately energized. The tape is then pulled from the bin 192 and into the bin 190.

A tape transport for driving a tape wound on coaxial reels 220 is shown in FIG. 7. To simplify the illustration, one of these reels 220 is shown as a disk 222 of relatively large diameter which serves as a hub on which the magnetic tape 224 is wound. The other of these reels 220 is shown as a disk 226 of smaller diameter which may be integral with or fastened to the disk 222. The disk 226 also serves as a hub for winding the tape 224. The reels are similar in shape to a stepped pulley. The disks 222 and 226 may be flanged to prevent the tape from meandering laterally.

The tape travels along a rectangular path defined by a plurality of guides 228, 230, 232, 234 and 236. These guides may be rotatable and flanged. A loop 238 of tape is formed by a jockey roller 240 which is biased in a direction inwardly of the loop by a spring 242. A magnetc head 244 is disposed near one of the rollers 232 for scanning the coated side of the tape 224, another roller 245 is disposed on the opposite side of the tape 224 to aid in guiding the tape past the head 244.

A pair of electrostatic drive units 246 and 248 is provided each on a different side of the rectangular loop for driving the tape in a forward direction indicated by the arrow 250. An electrostatic brake 252 cooperates with the tape between the slack loop 230 and the first forward drive unit 246. This electrostatic brake may be similar in construction to the electrostatic drive unit. It is disposed parallel to the path of the tape. When the brake is energized, the tape is attracted thereto and moves in a direction normal to the surface of the brake. The brake 252 is electrically connected in parallel with the second forward drive unit 248 in order to prevent the spring-biased jockey roller 240 from pulling the slack length of tape, released by the first forward drive unit 246, in the reverse direction into the loop 238 against the driving forces exerted by the second forward drive unit 248.

The tape may be fed in the reverse direction, indicated by the arrow 254, by two reverse drive units 256 and 258, respectively, disposed on the opposite side of the tape from the second forward drive unit 248 and the first forward drive unit 246. The reverse drive units 256 and 258 are inclined towards the path of the tape in a sense opposite to the sense inclination of the forward drive units 246 and 248. The heels of all of the drive units 246, 248, 256 and 258 are in contact with the tape. Although the reverse drive units are in contact with the oxide coated side of the tape which is conductive, the conductive plates 48 and 52 (FIG. 2) of the drive units are spaced from the coated side of the tape by insulating material, as shown in FIG. 2.

An electrostatic brake 260 similar to the brake 252 is disposed between the guide 236 and the reels 220. This brake 260 is connected in parallel with the second reverse drive unit 258 and is energized simultaneously therewith. When the brake 260 is energized, it prevents the tape from moving in the forward direction under the force due to the spring-biased jockey roller 240 and against the driving force of the second reverse drive unit 258.

The forward drive units 246 and 248 of FIG. 7 may be connected to an energizing circuit similar to that shown in FIG. 4 so that these units are alternately energized. The reverse drive units may be alternatively energized by the same transformers as are used for energizing the forward drive units 246 and 248 by means of a switch arrangement in the secondaries of these transformers, as discussed above in connection with FIG. 6. Alternatively, an additional pair of high voltage transformers may be used and their primaries connected alternatively with the primaries of the transformers used to energize the forward drive units 246 and 248 to the rotary switch 64 of the drive circuit, as shown in FIG. 4.

When the system is conditioned to drive the tape in the forward direction, the forward drive units 246 and 248 of FIG. 9 are alternately energized. The brake 252 is energized simultaneously with the second forward drive unit 248. The first drive unit 246 pulls the tape from the smaller disk 226 and out of the loop 238. The loop 238 accommodates for the difference in diameters of the reels of tape on the smaller and larger disks 222 and 226 of the coaxial reels 220 by storing a length of tape equal to the difference between the length of the last turn of tape on the larger disk 222 and the length of the last turn of tape on the smaller disk 226. An increment of tape is then advanced past the magnetic head 224 and is available to receiving a recording. When the second drive unit 248 is energized and the first drive unit 246 is deenergized, the slack length of tape previously pulled from the reels 220 is transferred to the second drive unit 248. The brake 252 holds the tape against movement in the reverse direction into the slack loop 238 under the force applied by the spring-biased jockey roller 240. Subsequent deenergization of the second drive unit 248 and energization of the first drive unit 246 causes the reels to rotate and advances another increment of tape past the magnetic head 244. Since the disks 222 and 226 of the reels 220 rotate together, the rotation of the reel disk 226 in supplying a length of tape to the forward drive unit 246 is accompanied by the rotation of the larger disk 222 to take up the slack length of tape released by the second forward drive unit 248, when it is deenergized. The spring-biased jockey roller moves to take up the differences in length of the tape on the smaller and larger disks 226 and 222 of the reels 220. Separate drive for the reels 220 is therefore unnecessary.

When the tape transport is conditioned for reverse direction driving, the reverse drive units 256 and 258 are alternately energized. Each time the first drive unit 256 is energized, another increment of tape is pulled past the magnetic head 244. The reverse drive units 256 and 258 and the electrostatic brake 260 operates substantially similarly to the forward drive units 246 and 248 and the brake 252, respectively.

FIG. 8 shows a tape transport mechanism which does not require any rotating parts for its operation. A tape, such as a magnetic tape 270 is fed along an inverted U-shaped path from a supply bin 272 to a take-up bin 274. The bins are disposed in the lower part or bottom of the tape transport in order to cause the tape to drop by gravity into the bins. Four forward drive units 276, 278, 280 and 282 are arranged on the inside of the path for driving the tape in a forward direction, as indicated by an arrow 284. The heels 286 of these units are arranged along a semicircle and are disposed in contact with the base film side of the tape. Accordingly, the tape path is approximately a semicircle in the upper part thereof. A brake 288 is disposed between the first forward drive unit 276 and the supply bin 272. A magnetic head 290 for scanning the tape is located between the brake 288 and the supply bin. The head 290 contacts the coated side of the tape 270. Another head may be disposed adjacent to the take-up bin 274 and used to record information on the tape when the tape is driven in a reverse direction.

Each of the drive units is inclined toward the path of the tape by a small acute angle in the direction of tape travel. Several pairs of drive units are used to permit the desired inclination of the drive units with respect to the path of the tape without requiring any additional guides which might require rotating bearings.

Alternate ones of the drive units 276, 278 and 280, 282 are energized alternately in pairs by connecting the drive units 276 and 278 to the secondary of one of the transformers I of the drive circuits (FIG. 4) and the drive units 280 and 282 of the other transformer II of the drive circuit. The brake 288 is connected in parallel with the second pair of drive units 280 and 282 and energized simultaneously therewith to prevent the tape from falling back into the supply bin 272 when the first drive unit 276 is deenergized.

A second group of electrostatic drive units 290, 292, 294 and 296 is provided around the outside of the tape path and opposite to the first group of drive units 276, 278, 280 and 282 for feeding the tape in a reverse direction. The heels 298 of the second drive units contact the tape opposite to the heels 286 of the first drive unit. Alternate ones of the reverse drive units 290, 292 and 294 and 296 are connected to be energized alternately. This is accomplished by connecting one pair of the reverse drive units to the secondary of one high voltage transformer I and the other pair of reverse drive units 294 and 296 to the secondary of the other high voltage transformer II. These high voltage transformers may be the same as used to energize the forward drive units and may be connected alternatively to the forward and reverse units by means of a switch. Another pair of high voltage transformers may instead be used as explained above in connection with FIGS. 6 and 7.

Assuming forward drive is desired, the first and third forward drive units 276 and 278 are energized and tape is then transferred from the supply bin 272 to the first drive unit 276. The second drive unit 280 takes up the slack length of tape previously advanced by the first drive unit 276, as will be explained hereinafter. When the second and fourth drive units 280 and 282 are energized and the first and third drive units 276 and 278 are deenergized, the slack length of tape advanced by the first and third drive units are taken up by the second and fourth drive units 280 and 282. The brake 288 is energized and prevents the increment of tape previously pulled from the bin 272 by the first drive unit 276 from falling back, under the influence of gravity into that bin 272. When the first and third drive units 276 and 278 are again energized, the increment of tape which was advanced by the fourth drive unit 288 falls under the influence of gravity into the take-up bin 274. The third drive unit 278 takes up the increment of tape which was held by the second drive unit 280. The first drive unit advances a successive increment of tape and indexes a new portion of tape adjacent the magnetic head. The reverse drive units 290, 292, 294 and 296 and the brake 297 may operate in a manner similar to the forward drive units 276, 278, 280 and 282 to advance the tape incrementally from the take-up bin 274 to the supply bin 272.

From the foregoing description, it will be apparent that there has been provided a new tape drive system which may omit the need for rotating parts. While the drive is described as an incremental drive an effectively continuous drive may be provided by using a sufficiently high incremental drive rate. Other variations and modifications in and applications for drive systems embodying the invention will, undoubtedly, become apparent to those skilled in the art. Accordingly, the foregoing description should be taken merely as illustrative and not in any limiting sense.

What is claimed is:

1. Apparatus for feeding a tape along a path comprising at least one pair of drive units having surfaces extending longitudinally along said path and having a heel and a toe at opposite ends thereof, said pair of drive units being spaced from each other along said path with said heel and toe ends of different ones of said pair of units disposed successively along said path, said heel end of each of said pair of units being closer to said path than said toe end thereof, and means for electrically energizing said pair of drive units for alternately attracting said tape thereto.

2. Apparatus for feeding an electrically conductive tape along a path comprising (a) at least one pair of drive units having surfaces extending longitudinally along said path and each having a heel and a toe at opposite ends of their said surfaces, members of conductive material being disposed in said unit along their said surfaces, (b) said pair of drive units being spaced from each other along said path with said heel and toe ends of different ones of said units disposed successively along said path, (c) said heel end of each of said pair of units being closer to said path than said toe end thereof, and (d) means for applying operating voltages alternately to said conductive material members of different ones of said drive units for alternately attracting said tape thereto.

3. An electrostatic tape driving system comprising (a) a tape drive unit including a body of insulating material, (b) a pair of members of electrically conductive material disposed in spaced relationship in said body, (c) means for energizing said tape drive unit comprising a step-up transformer having a primary winding and a secondary winding, (d) means for connecting opposite ends of said secondary winding to different ones of said conductive material members, and (e) means for applying alternating current voltage to said primary winding.

4. An electrostatic tape driving system comprising (a) a first and a second tape drive units, each including a body of insulating material and a pair of electrically conductive material disposed in spaced relationship longitudinally of said body, (b) means for energizing said tape drive units comprising (1) a pair of step-up transformers each having a primary winding and a secondary winding, (2) means for connecting opposite ends of one of said secondary windings to different ones of said conductive material members of said first unit, (3) means for connecting opposite ends of the other of said secondary windings to different ones of said conductive material members of said second unit, and (4) means for applying alternating current voltage alternately to different ones of said primary windings.

5. Apparatus for feeding an endless tape comprising (a) a pair of tape drive units, each having surfaces disposed opposite spaced lengths of said tape, said surfaces being inclined toward said tape in the direction of tape feed, (b) each of said units including means for attracting said tape to their said surfaces when energizing electrically, and (c) means for alternately electrically energizing said units to attract said tape alternately to the surfaces of different ones of said units.

6. Apparatus for feeding an endless tape having at least a layer of conductive material comprising (a) a plurality of guides defining a loop path for said tape, (b) a pair of tape drive units, each having a heel and a toe at opposite ends thereof and a member of conductive material extending between said heel and said toe and disposed adjacent spaced parts of said tape path with the heel and toes of different ones of said units disposed successively along said path, said heels being in contact with said tape and said toes being spaced from said tape, and (c) means for alternately energizing said units to attract said tape thereto.

7. A tape transport for feeding an endless magnetic tape along a loop path comprising (a) a pair of electrostatic tape drive units each having a heel and a toe at opposite ends thereof and disposed adjacent spaced lengths of said tape with the heel and toes of different ones of said units disposed successively along said path, (b) said heels being in contact with said tape and said toes being spaced from said tape, (c) a magnetic head disposed adjacent said path between the heel of one of said units and the toe of the other for scanning said record, and (d) means for alternately applying operating voltages to said units for incrementally feeding said tape along said path.

8. Apparatus for feeding a tape along a path comprising
(a) at least one pair of drive units having surfaces extending longitudinally along said path and having a heel and a toe at opposite ends thereof,
(b) said pair of drive units being spaced from each other along said path with said heel and toe of different ones of said units disposed successively along said path,
(c) means for electrically energizing said drive units for alternately attracting said tape thereto, and
(d) means for pivoting said pair of drive units in opposite directions for selectively bringing said heels closer to said path than said toes, and vice versa, for reversing the direction of feed of said tape along said path.

9. Apparatus for feeding a tape along a path between a pair of reels on which the tape is wound comprising
(a) a pair of tape drive units spaced from each other along the path of travel for alternately attracting successive increments of said tape, each of said drive units having a surface extending longitudinally along said tape path, and having a heel and toe on opposite ends of said units,
(b) said heel and toe of different ones of said units being disposed successively along said path,
(c) means for pivoting said units in one direction to bring the heels of said units closer to said tape than the toes thereof and for pivoting said units in the opposite direction to bring the toes of said units closer to said tape than the heels thereof for reversing the direction of feed of said tape, and
(d) means for driving different ones of said reels in a direction to take up said tape depending upon the direction in which said units are pivoted.

10. Apparatus for feeding a tape in opposite direction along a path comprising
(a) first and second pairs of tape drive units,
(b) said drive units being spaced from each other along said path and having surfaces extending longitudinally along said path on the same side thereof,
(c) said surfaces of said first pair of units being inclined in one direction to said path,
(d) said surfaces of said second pair of units being inclined in an opposite direction to said path,
(e) means for alternately energizing said units of said first pair for incrementally feeding said tape in one direction along said path, and
(f) means for alternately energizing said units of said second pair for incrementally feeding said tape in said opposite direction along said path.

11. Apparatus for feeding a tape in opposite directions along a path comprising
(a) first and second pairs of tape drive units,
(b) said drive units being spaced from each other along said path and having surfaces extending longitudinally along said path,
(c) said first pair and said second pair of units being disposed on opposite sides of said path,
(d) said surfaces of said first and second pairs of units being inclined in the same direction to said path,
(e) means for alternately energizing said units of said first pair for incrementally feeding said tape in one direction along said path,
(f) and means for alternately energizing said units of said second pair for incrementally feeding said tape in said opposite direction along said path.

12. Apparatus for feeding a tape along a path between first and second tape storage means comprising
(a) a pair of drive units spaced from each other along said path for attracting successive increments of said tape when energized, (b) means for alternately energizing said units for feeding said successive increments from said first storage means to said second storage means, and
(c) means driven by said tape increments advanced by the first energized one of said units for stripping a corresponding increment from said second energized one of said units into said second storage means.

13. Apparatus for feeding a tape along a path from a first tape storage bin to a second tape storage bin comprising
(a) a pair of tape drive units spaced from each other along said path for attracting sucessive increments of said tape when energized,
(b) means for alternately energizing said units for feeding said successive increments from said first storage means to said second storage means,
(c) an idler roller,
(d) a first pressure roller for pinching said tape leaving said first bin into driving engagement with said idler roller, and
(e) a second pressure roller for pinching said tape entering said second bin into driving relationship with said idler roller, whereby said increment of tape advanced by the first energized one of said units turns said idler roller for stripping a corresponding increment of tape from said second energized one of said idler rollers into said second bin.

14. Apparatus for feeding a tape along a path comprising
(a) a means at each end of said path for taking up said tape,
(b) first and second tape drive electrosttatic units spaced from each other successively along said path from one to the other of said path ends for electrostatically attracting successive increments of said tape and feeding said increments from said one to said other of said path ends when energized,
(c) brake means disposed between a first of said tape drive units and said one path end, and
(d) means for energizing said first unit alternately with said second unit and said brake means for feeding said successive increments from said one path end to said other path end.

15. Tape transport apparatus comprising
(a) a plurality of tape drive members for attracting said tape when energized,
(b) said members having heel and toe ends and being disposed successively along a path extending upwardly from one end of said path and downwardly toward the opposite end of said path,
(c) said heel ends of said members defining said path and said toe ends of said members being spaced from said path, and
(d) means for successively energizing alternate pairs of said plurality of members for advancing successive increments of said tape upwardly and then downwardly from said one end of said path to said other end of said path.

16. Tape transport apparatus for transporting a tape between a pair of tape storage bins
(a) a plurality of tape drive members disposed above said bin for attracting said tape when energized,
(b) said members having heel and toe ends and being disposed successively along an inverted U-shaped path,
(c) said heel ends of said members defining an approximately semi-circular portion of said path and said toe ends of said members being spaced from said path,
(d) means for successively energizing alternate pairs of said plurality of members for advancing successive increments of said tape upwardly and then downwardly from said one of said bins to the other of said bins, (e) a brake member disposed between said one bin and the one of said drive members adjacent said one bin, and (f) means for energizing said brake member simultaneously with the second of said alternate pairs of said drive members.

References Cited by the Examiner

UNITED STATES PATENTS

| | | | |
|---|---|---|---|
| 1,706,741 | 3/1929 | Pugh | 226—94 X |
| 1,923,609 | 8/1933 | Black | 226—93 |
| 2,141,104 | 12/1938 | Buccicone | 226—93 |
| 2,816,757 | 12/1957 | Burkhart | 226—95 |
| 2,975,990 | 3/1961 | Rodriguez | 242—71.2 |
| 2,982,489 | 5/1961 | Horres | 242—55.19 |
| 2,984,398 | 5/1961 | Chalmers | 226—95 |
| 2,986,725 | 5/1961 | Dirks | 340—174.1 |
| 3,053,427 | 9/1962 | Wasserman | 226—118 |
| 3,115,620 | 12/1963 | Cooper et al. | 340—174.1 |
| 3,185,403 | 5/1965 | Bean | 226—94 X |

M. HENSON WOOD, Jr., *Primary Examiner.*

ERVIN L. SRAGOW, *Examiner.*

F. C. WEISS, A. N. KNOWLES, *Assistant Examiners.*